US007509873B2

(12) United States Patent
Mlinar et al.

(10) Patent No.: US 7,509,873 B2
(45) Date of Patent: Mar. 31, 2009

(54) METHOD AND APPARATUS FOR FAILURE PROBABILITY DENSITY FUNCTION DETERMINATION

(75) Inventors: Sharyn E. Mlinar, Wilmington, DE (US); Matthew H. Cawthorne, Newton Square, PA (US); David L. Downey, Harleysville, PA (US); Donna M. Irby, New Castelle, DE (US)

(73) Assignee: The Boeing Company, Chicago, IL (US)

( * ) Notice: Subject to any disclaimer, the term of this patent is extended or adjusted under 35 U.S.C. 154(b) by 89 days.

(21) Appl. No.: 11/615,921

(22) Filed: Dec. 22, 2006

(65) Prior Publication Data

US 2008/0148865 A1     Jun. 26, 2008

(51) Int. Cl.
*G01N 3/32* (2006.01)
(52) U.S. Cl. .............................. 73/811; 73/788; 73/802
(58) Field of Classification Search .................... 73/788, 73/802, 811
See application file for complete search history.

(56) References Cited

U.S. PATENT DOCUMENTS

| | | | | |
|---|---|---|---|---|
| 5,951,800 | A * | 9/1999 | Pettit | 156/157 |
| 6,758,924 | B1 * | 7/2004 | Guijt | 156/64 |
| 2002/0164251 | A1 * | 11/2002 | Sehgal et al. | 416/134 A |

OTHER PUBLICATIONS

Taban, Faruk; Luo, Shen-Yi; Evrensel, Cahit A. and Mitra, Aniruddha "Predicting Biaxial Behavior of the Soft Tissues using Uniaxial Tensile Tests" by Advances in Bioengineering, BED-vol. 39, Edited by Ajit P. Yoganathan, ASME, Anaheim, 1998 Abstract.

Sun, C. T. (2004) Purdue University, Development of composites reinforced with short wavy fibers, US Air Force Grant F49620-02-1-0018, annual report May 11, 2004.

Pratt, W. F. and Allen, M. S. Patterned Fiber Composites, Inc. Characterization and finite element model correlation of wavy composites. Presented at the conference of Society for the Advancement of Materials and Processes Engineering 2001.

Kriz, R. D. Associate Professor, Engineering Sciences and Mechanics, Virginia Polytechnic Institute and State University, Microstructure Lectures. Retrieved Mar. 2006 from www.jwave.vt.edu/ered/kriz/lectures Available on http://www.jwave.vt.edu/crcd/kriz/lectures/OnePageLect.html.

(Continued)

*Primary Examiner*—Harshad Patel
*Assistant Examiner*—Freddie Kirkland, III
(74) *Attorney, Agent, or Firm*—Felix L. Fischer

(57) ABSTRACT

A coupon fabrication with defined distortion in the form of marceled fibers and test protocol is employed to determine the shape of the failure probability density curve to improve the analyses of the risk of fiber distortion anomalies in composite structures. This protocol provides a method to determine the probability of and the severity of the various distorted fiber conditions that might exist on composite structure in fabrication and in service. A distortion characterization matrix is established for determining test shapes and providing defect characterization based on the results of tests on the selected shapes. Coupons for test are created using resin pool.

10 Claims, 6 Drawing Sheets

OTHER PUBLICATIONS

Experimental Design (Industrial DOE), Starsoft Inc. 2008.

Dealy, J. M. Official nomenclature for material functions describing the response of a viscoelastic fluid to various shearing and extentional deformations. Department of Chemical Engineering, McGill University Montreal. The Society of Rheology, Inc. 39(1, 253-265) (1995).

Caiazzo, A., Orlet, M., McShane, H., Strait, L., and Rachau, C. The effects of marcel defects on composite structural properties, To appear in Composite Structure: Theory and Practice STP 1383. Applied Research Laboratory, Penn State University, State College, PA. 1999.

Unknown author. (2004) The Rotor Blade. Retrieved from http://www.chinook-helicopter.com/standards/areas/blade.html.

Fatigue Life (Birnbaum-Saunders), Engineering Statistics Handbook, 8.1.6.6, NIST. Retrieved Jun. 2005 from www.itl.nist.gov/div898/handbook/apr/section1/apr166.htm.

Probability Plot Correlation Coefficient Plot, Engineering Statistics Handbook, 1.3.3.23, NIST. Retrieved Jun. 2005 from www.itl.nist.gov/div898/handbook/eda/section3/ppccplot.htm.

Kinsella, M. and Murray, D., Crane, D., Manicelli, J., and Kranje, M. (2002) Mechanical Properties of Polymeric Composites reinforced with high strength glass fibers. Paper presented at the 33rd ISTC—Seattle, WA—Nov. 5-8, 2001.

Hale, B., "Engineers develop fabrication method for safer flywheels", Pennsylvania State University Staff Newspaper, Intercom Online, May 15, 1997 vol. 26, Issue 31.

McIntyre, J. S. et al. Wave propagation in a composite with wavy reinforcing fibers, Review of Progress in Quantitative Nondestructive Evaluation vol. 14, pp. 1311-1318, Plenum Press, New York, 1995.

McBagonluri-Nuuri, D. F. Simulation of Fatigue Performance & Creep Rupture of Glass-Reinforced Polymeric Composites for Infrastructure Applications, Thesis submitted to the Faculty of the Virginia Polytechnic Institute and State University, Aug. 18, 1998.

* cited by examiner

US 7,509,873 B2

METHOD AND APPARATUS FOR FAILURE PROBABILITY DENSITY FUNCTION DETERMINATION

BACKGROUND OF THE INVENTION

1. Field of the Invention

This invention relates generally to the field of testing for failure criteria determination in composite matrices and more particularly to a protocol including a method for coupon fabrication and testing to determine failure characteristics in multi-ply composite systems with templates for distortion comparison and disposition.

2. Description of the Related Art

Composite fabrication aircraft and helicopter structural systems requires high reliability for safety of flight elements. Testing for various voids or distortions in the plies of composite materials such as glass reinforced fiber composites and related determinations of engineering quality dispositions for anomalies that are located requires repeatable techniques for development of a database for use in such review. As an example, fiber distortions occur in helicopter rotor blade spar straps near critical root end stations. This area is critical because it is a force concentration area during the operation of the rotor blade. Any degradation of strength in that area is of concern.

The fiber distortion anomalies are detectable through various testing techniques such as X-ray. However, since no repair is possible upon detection of distorted fibers in the root end as in many other critical structural components in aircraft and helicopters, the disposition can only be "use as is" or "scrap" depending on the severity of the distorted fibered composite. In the specific example this is particularly true if it occurs in the critical blade root end. Current procedures have allowed a number of the blades to be dispositioned "use as is" following careful case-by-case evaluation.

Current fatigue and crack propagation models and statistical analysis methods employed in analyzing composite anomalies use the Miners Rule or the later fatigue model by Birnbaum-Saunders. Both are models for crack propagation in metal. No current models for glass reinforced composite materials are available. Some limited experimentation has been performed at the University of Akron, Cambridge University and numerous papers are available on the development of finite element models, for example Pratt, W. F. and Allen, M. S. *Patterned Fiber Composites, Inc. Characterization and finite element model correlation of wavy composites*; Caiazzo, A. and Orlet, M., McShane, H., Strait, L., and Rachau, C. *The effects of marcel defects on composite structural properties*. Little has been done in the development of empirical data for the determination of the shape of the failure curve for glass reinforced composite with marceled conditions.

It is therefore desirable to provide consistent and repeatable data for characterization of marceled conditions and their impact on the life of rotor blades and other crack-prone parts made from the same or similar material. Such information is desirable to catalog the physical properties for use in engineering disposition of comparable anomalies identified in production components and to validate the current inspection routines in the composite shop and also to calculate the risk to fielded rotorcraft and/or determine the impact on the manufacturing processes creating rotor blade root ends.

SUMMARY OF THE INVENTION

The embodiments disclosed herein for the present invention provide a coupon fabrication technique with defined distortion in the form of marceled fibers and test protocol to determine the shape of the failure probability density curve to improve the analyses of the risk of fiber distortion anomalies in composite structures. This protocol provides a method to determine the probability of and the severity of the various distorted fiber conditions that might exist on the rotor blades for the exemplary application in the future and those that are currently in fabrication and in service.

The response variable data and analyses information provided by the invention enables operations and quality personnel to make better informed decisions during production operations and at inspection points during the production and at final buy off of composite structural components using comparative standards derived from the distortion shapes employed in the coupon testing protocol.

The determination of the failure characteristics instigated by distorted fibers in the material also enables improvements to the design of future composite structures. The data provided by the invention and associated finite element analyses which can be conducted based on the test protocol enhances engineering decision-making ability and add to the knowledge of composite materials engineering, stress engineering, quality engineering and composite testing and quality verifications.

BRIEF DESCRIPTION OF THE DRAWINGS

These and other features and advantages of the present invention will be better understood by reference to the following detailed description when considered in connection with the accompanying drawings wherein:

FIG. 1a is side view of a test coupon defined according to the protocol of the present invention;

FIG. 1b is a front view of the test coupon of FIG. 1a;

FIG. 1c is a front view of an exemplary test coupon with added gripping pads;

FIG. 1d is a side view of an exemplary test coupon with the added gripping pads.

DETAILED DESCRIPTION OF THE INVENTION

Figures 1A, 1B, 1C, 1D:
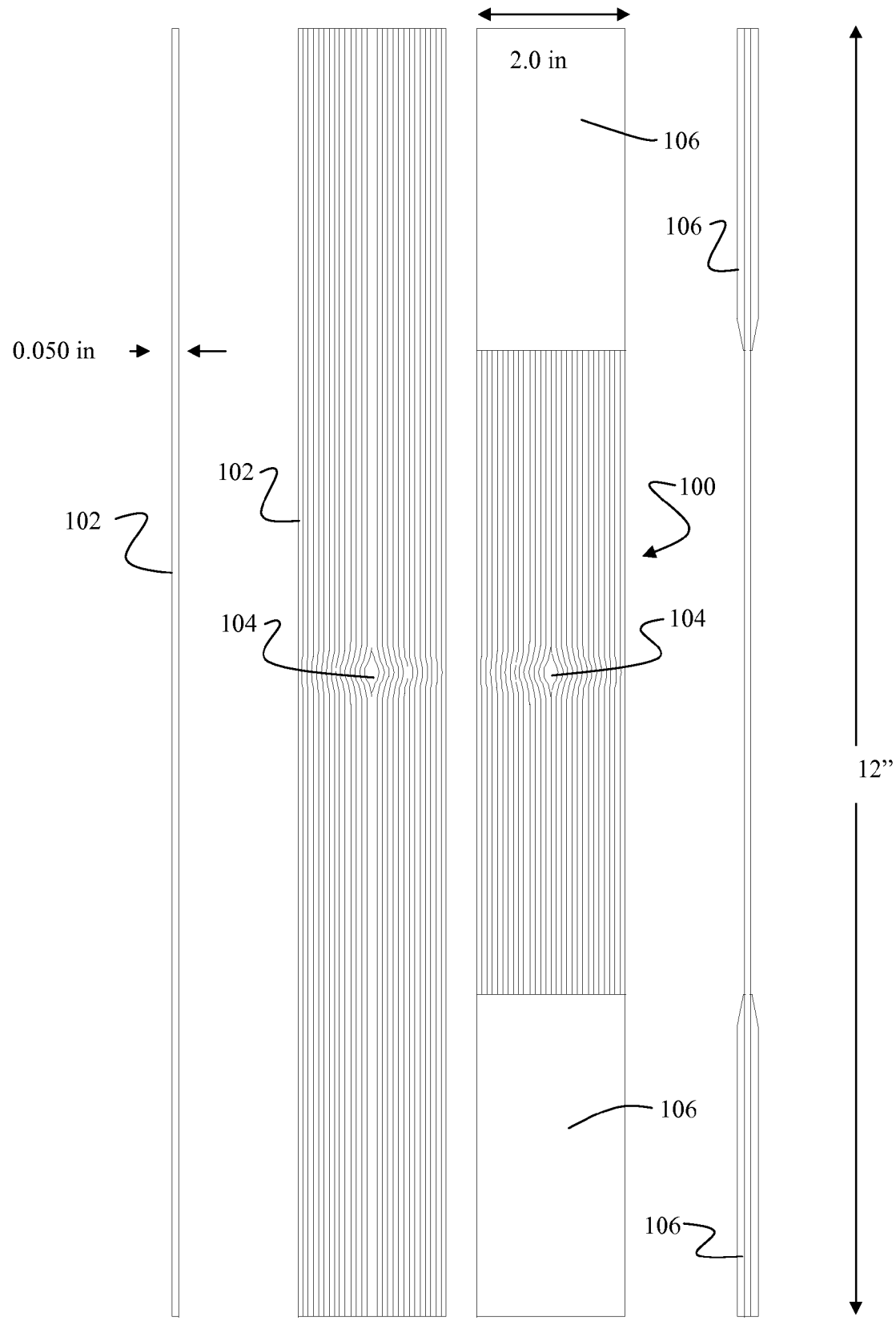

The protocol of the present invention defines the impact of fiber distortion defects on the tensile strength property of composite lay-ups. A coupon 100, shown in FIG. 1c employs the same materials and simulates the wave-like characteristics found in marceled distortions present in production fiber composite layups. For an exemplary composite system of BMS 08-196 Unidirectional coupons are built using a multi-ply layup incorporating a resign pool distortion shape selected from a distortion curve set as will be described in greater detail subsequently. For example coupons described herein the layup comprises 40 layers. The coupons are then sliced perpendicular to the layup with a thickness of approximately 0.050 inch. Tapes of varying width are created depending on the number of layers with 1.5 inch to 2.0 inch tapes 102, shown in FIG. 1a (exaggerated in the thickness dimension in the figure for clarity) and 1b showing a 0.050 slice of the test element resin pool distortion shape 104 included at a predetermined position as described above. The cure cycle replicates the production cure for the material being tested. Gripping pads 106 are added at the top and bottom of the coupon for engagement in a tensile testing machine.

To replicate potential defect locations, sample coupons are prepared with the defect present in the surface layer, two layers from the surface and at the middle of the layers in the coupon. For the exemplary coupons discussed herein a 40 ply layup is employed.

Figure 2:
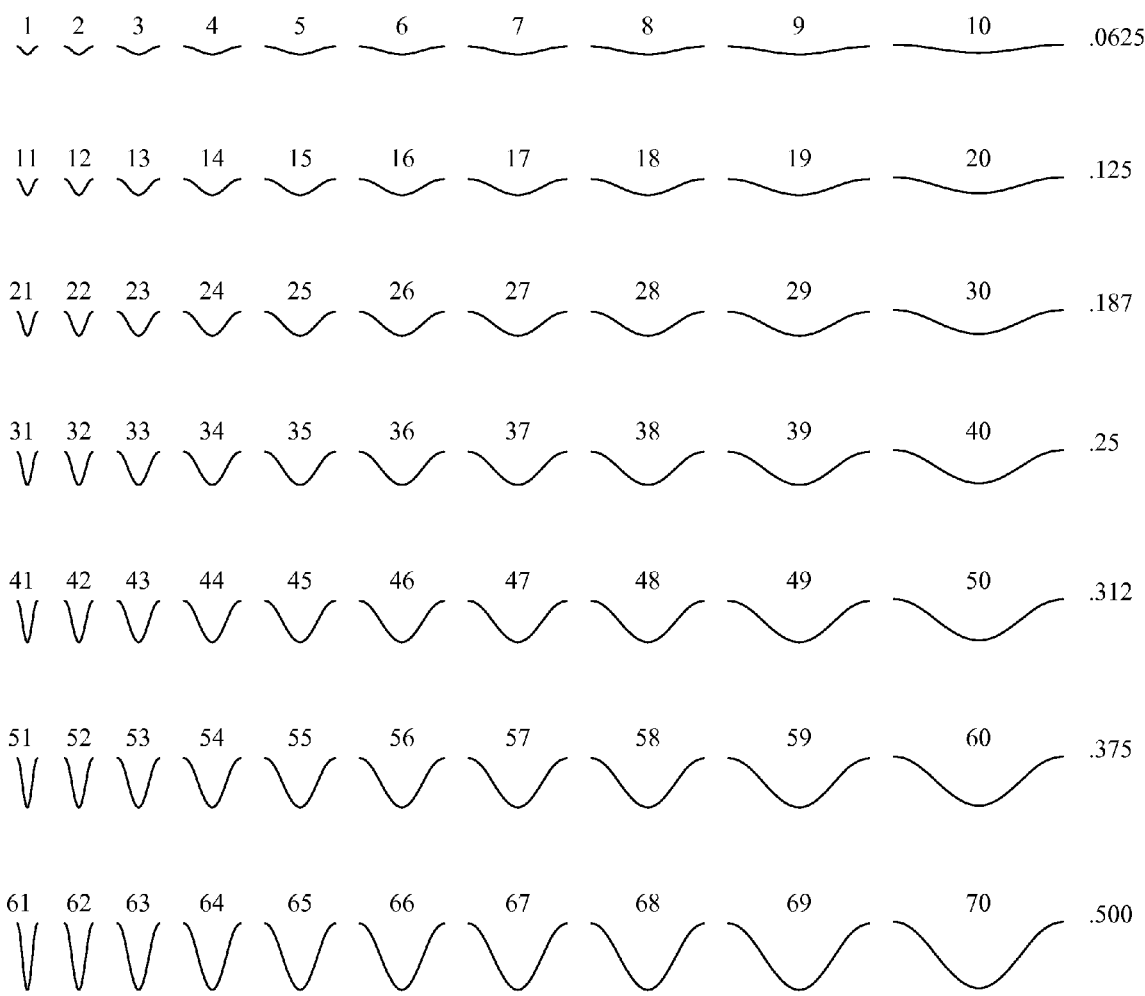
FIG. 2 shows distortion curve shapes defined for selecting a test set according to the protocol of the invention and comparative standard templates for uncontoured regions.

FIG. 2 shows exemplary curves 1 to 60 representative of half shapes for idealized cases of the marceled distortions found in composites studied. Curves 1-10 have a height of 0.0625 inch with total length (cord) varying from 0.188 inch to 1.5 inches. Similarly, curves 11-20 have a height of 0.125 inch with cord varying from 0.188 to 1.5 inches. Curves 21-30 have a height of 0.1875, curves 31-40 a height of 0.25 inch, curves 41-50 a height of 0.3125, curves 51-60 a height of 0.375 inch, curves 61-70 a height of 0.5 inch. Selected ones of the curves, as will be defined subsequently, have distortion shapes machined from resin pools comprised of the same resin as the composite under test.

Figure 3:
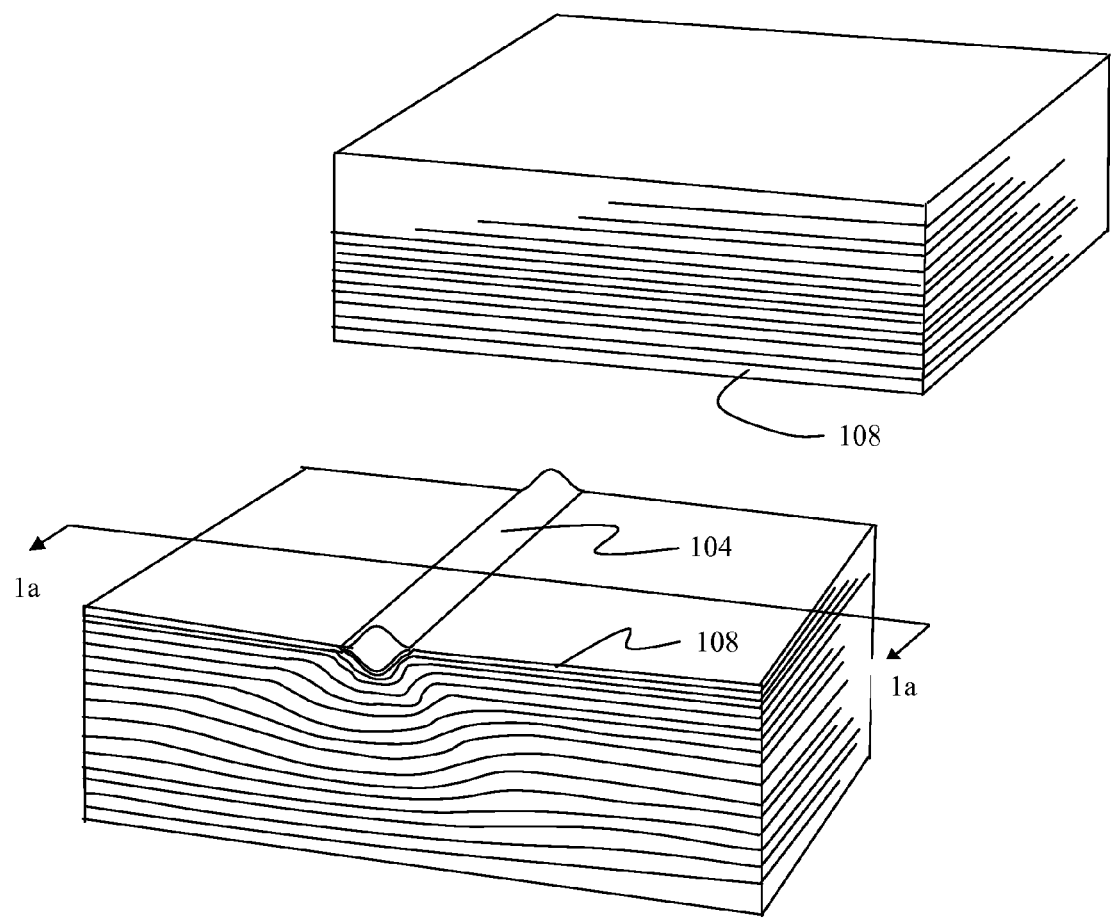
FIG. 3 is a pictorial view of a resin pool distortion shape, as machined, during insertion into the layup.

As shown in FIG. 3, a resin pool is cured and machined to provide a distortion shape 104 which is inserted between composite layup layers 108 at the location predetermined as previously described. The middle layer location is shown in FIG. 3 as exemplary. Slicing of the layup to create the test coupons is accomplished as represented by line 1a-1a.

A distortion category is created by establishing a figure of merit based on the amplitude of the distortion and its length. For the exemplary embodiment, the figure of merit is proportional to $h^2$ and L and is specifically defined by first determining the aspect ratio, h/L, based on the distortion amplitude and length for each of the shapes defined in FIG. 2. A determination of a figure of merit is then accomplished by multiplying the distortion amplitude by the aspect ratio multiplied by a percentage of fiber involvement. This function for the embodiment disclosed herein is equal to the percentage for lugs with less than 80% distortion and grows to 160% for completely involved lugs. A defined distortion category is then determined based on the figure of merit by value assignment where if the figure of merit (FOM) is less than or equal to 0.125 then the distortion category is defined as 1. If 0.125<FOM<=0.25 the distortion category is defined as 1.5. If 0.25<FOM<=0.85 the distortion category is defined as 2. If 0.85<FOM<=1.75 the distortion category is defined as 2.5. If 1.75<FOM<=3.1 the distortion category is defined as 3. If 3.1<FOM<=4.8 the distortion category is defined as 3.5. If 4.8<FOM<=6.8 the distortion category is defined as 4. If 6.8<FOM<=9.3 the distortion category is 4.5. While if the FOM>9.3 the distortion category is defined as 5. Table 1 shows the resulting aspect ratio and calculated FOM for the distortion shapes of FIG. 2. Table 2 provides the resulting distortion category with values over 5 being ignored.

TABLE 1

| h | L | % 0.100 | % 0.200 | % 0.300 | % 0.400 | % 0.500 | % 0.600 | % 0.700 | % 0.800 | % 1.100 | % 1.600 | h/L |
|---|---|---|---|---|---|---|---|---|---|---|---|---|
| 0.063 | 0.188 | 0.208 | 0.417 | 0.625 | 0.833 | 1.042 | 1.250 | 1.458 | 1.667 | 2.292 | 3.333 | 3.0 |
| 0.063 | 0.25 | 0.156 | 0.313 | 0.469 | 0.625 | 0.781 | 0.938 | 1.094 | 1.250 | 1.719 | 2.500 | 4.0 |
| 0.063 | 0.375 | 0.104 | 0.208 | 0.313 | 0.417 | 0.521 | 0.625 | 0.729 | 0.833 | 1.146 | 1.667 | 6.0 |
| 0.063 | 0.5 | 0.078 | 0.156 | 0.234 | 0.313 | 0.391 | 0.469 | 0.547 | 0.625 | 0.859 | 1.250 | 8.0 |
| 0.063 | 0.625 | 0.063 | 0.125 | 0.188 | 0.250 | 0.313 | 0.375 | 0.438 | 0.500 | 0.688 | 1.000 | 10.0 |
| 0.063 | 0.75 | 0.052 | 0.104 | 0.156 | 0.208 | 0.260 | 0.313 | 0.365 | 0.417 | 0.573 | 0.833 | 12.0 |
| 0.063 | 0.875 | 0.045 | 0.089 | 0.134 | 0.179 | 0.223 | 0.268 | 0.313 | 0.357 | 0.491 | 0.714 | 14.0 |
| 0.063 | 1 | 0.039 | 0.078 | 0.117 | 0.156 | 0.195 | 0.234 | 0.273 | 0.313 | 0.430 | 0.625 | 16.0 |
| 0.063 | 1.25 | 0.031 | 0.063 | 0.094 | 0.125 | 0.156 | 0.188 | 0.219 | 0.250 | 0.344 | 0.500 | 20.0 |
| 0.063 | 1.5 | 0.026 | 0.052 | 0.078 | 0.104 | 0.130 | 0.156 | 0.182 | 0.208 | 0.286 | 0.417 | 24.0 |
| 0.125 | 0.188 | 0.833 | 1.667 | 2.500 | 3.333 | 4.167 | 5.000 | 5.833 | 6.667 | 9.167 | 13.333 | 1.5 |
| 0.125 | 0.25 | 0.625 | 1.250 | 1.875 | 2.500 | 3.125 | 3.750 | 4.375 | 5.000 | 6.875 | 10.000 | 2.0 |
| 0.125 | 0.375 | 0.417 | 0.833 | 1.250 | 1.667 | 2.083 | 2.500 | 2.917 | 3.333 | 4.583 | 6.667 | 3.0 |
| 0.125 | 0.5 | 0.313 | 0.625 | 0.938 | 1.250 | 1.563 | 1.875 | 2.188 | 2.500 | 3.438 | 5.000 | 4.0 |
| 0.125 | 0.625 | 0.250 | 0.500 | 0.750 | 1.000 | 1.250 | 1.500 | 1.750 | 2.000 | 2.750 | 4.000 | 5.0 |
| 0.125 | 0.75 | 0.208 | 0.417 | 0.625 | 0.833 | 1.042 | 1.250 | 1.458 | 1.667 | 2.292 | 3.333 | 6.0 |
| 0.125 | 0.875 | 0.179 | 0.357 | 0.536 | 0.714 | 0.893 | 1.071 | 1.250 | 1.429 | 1.964 | 2.857 | 7.0 |
| 0.125 | 1 | 0.156 | 0.313 | 0.469 | 0.625 | 0.781 | 0.938 | 1.094 | 1.250 | 1.719 | 2.500 | 8.0 |
| 0.125 | 1.25 | 0.125 | 0.250 | 0.375 | 0.500 | 0.625 | 0.750 | 0.875 | 1.000 | 1.375 | 2.000 | 10.0 |
| 0.125 | 1.5 | 0.104 | 0.208 | 0.313 | 0.417 | 0.521 | 0.625 | 0.729 | 0.833 | 1.146 | 1.667 | 12.0 |
| 0.188 | 0.188 | 1.875 | 3.750 | 5.625 | 7.500 | 9.375 | 11.250 | 13.125 | 15.000 | 20.625 | 30.000 | 1.0 |
| 0.188 | 0.25 | 1.406 | 2.813 | 4.219 | 5.625 | 7.031 | 8.438 | 9.844 | 11.250 | 15.469 | 22.500 | 1.3 |
| 0.188 | 0.375 | 0.938 | 1.875 | 2.813 | 3.750 | 4.688 | 5.625 | 6.563 | 7.500 | 10.313 | 15.000 | 2.0 |
| 0.188 | 0.5 | 0.703 | 1.406 | 2.109 | 2.813 | 3.516 | 4.219 | 4.922 | 5.625 | 7.734 | 11.250 | 2.7 |
| 0.188 | 0.625 | 0.563 | 1.125 | 1.688 | 2.250 | 2.813 | 3.375 | 3.938 | 4.500 | 6.188 | 9.000 | 3.3 |
| 0.188 | 0.75 | 0.469 | 0.938 | 1.406 | 1.875 | 2.344 | 2.813 | 3.281 | 3.750 | 5.156 | 7.500 | 4.0 |
| 0.188 | 0.875 | 0.402 | 0.804 | 1.205 | 1.607 | 2.009 | 2.411 | 2.813 | 3.214 | 4.420 | 6.429 | 4.7 |
| 0.188 | 1 | 0.352 | 0.703 | 1.055 | 1.406 | 1.758 | 2.109 | 2.461 | 2.813 | 3.867 | 5.625 | 5.3 |
| 0.188 | 1.25 | 0.281 | 0.563 | 0.844 | 1.125 | 1.406 | 1.688 | 1.969 | 2.250 | 3.094 | 4.500 | 6.7 |
| 0.188 | 1.5 | 0.234 | 0.469 | 0.703 | 0.938 | 1.172 | 1.406 | 1.641 | 1.875 | 2.578 | 3.750 | 8.0 |
| 0.25 | 0.1875 | 3.333 | 6.667 | 10.000 | 13.333 | 16.667 | 20.000 | 23.333 | 26.667 | 36.667 | 53.333 | 0.8 |
| 0.25 | 0.25 | 2.500 | 5.000 | 7.500 | 10.000 | 12.500 | 15.000 | 17.500 | 20.000 | 27.500 | 40.000 | 1.0 |
| 0.25 | 0.375 | 1.667 | 3.333 | 5.000 | 6.667 | 8.333 | 10.000 | 11.667 | 13.333 | 18.333 | 26.667 | 1.5 |
| 0.25 | 0.5 | 1.250 | 2.500 | 3.750 | 5.000 | 6.250 | 7.500 | 8.750 | 10.000 | 13.750 | 20.000 | 2.0 |
| 0.25 | 0.625 | 1.000 | 2.000 | 3.000 | 4.000 | 5.000 | 6.000 | 7.000 | 8.000 | 11.000 | 16.000 | 2.5 |

TABLE 1-continued

| h | L | % 0.100 | % 0.200 | % 0.300 | % 0.400 | % 0.500 | % 0.600 | % 0.700 | % 0.800 | % 1.100 | % 1.600 | h/L |
|---|---|---|---|---|---|---|---|---|---|---|---|---|
| 0.25 | 0.75 | 0.833 | 1.667 | 2.500 | 3.333 | 4.167 | 5.000 | 5.833 | 6.667 | 9.167 | 13.333 | 3.0 |
| 0.25 | 0.875 | 0.714 | 1.429 | 2.143 | 2.857 | 3.571 | 4.286 | 5.000 | 5.714 | 7.857 | 11.429 | 3.5 |
| 0.25 | 1 | 0.625 | 1.250 | 1.875 | 2.500 | 3.125 | 3.750 | 4.375 | 5.000 | 6.875 | 10.000 | 4.0 |
| 0.25 | 1.25 | 0.500 | 1.000 | 1.500 | 2.000 | 2.500 | 3.000 | 3.500 | 4.000 | 5.500 | 8.000 | 5.0 |
| 0.25 | 1.5 | 0.417 | 0.833 | 1.250 | 1.667 | 2.083 | 2.500 | 2.917 | 3.333 | 4.583 | 6.667 | 6.0 |
| 0.3125 | 0.1875 | 5.208 | 10.417 | 15.625 | 20.833 | 26.042 | 31.250 | 36.458 | 41.667 | 57.292 | 83.333 | 0.6 |
| 0.3125 | 0.25 | 3.906 | 7.813 | 11.719 | 15.625 | 19.531 | 23.438 | 27.344 | 31.250 | 42.969 | 62.500 | 0.8 |
| 0.3125 | 0.375 | 2.604 | 5.208 | 7.813 | 10.417 | 13.021 | 15.625 | 18.229 | 20.833 | 28.646 | 41.667 | 1.2 |
| 0.3125 | 0.5 | 1.953 | 3.906 | 5.859 | 7.813 | 9.766 | 11.719 | 13.672 | 15.625 | 21.484 | 31.250 | 1.6 |
| 0.3125 | 0.625 | 1.563 | 3.125 | 4.688 | 6.250 | 7.813 | 9.375 | 10.938 | 12.500 | 17.188 | 25.000 | 2.0 |
| 0.3125 | 0.75 | 1.302 | 2.604 | 3.906 | 5.208 | 6.510 | 7.813 | 9.115 | 10.417 | 14.323 | 20.833 | 2.4 |
| 0.3125 | 0.875 | 1.116 | 2.232 | 3.348 | 4.464 | 5.580 | 6.696 | 7.813 | 8.929 | 12.277 | 17.857 | 2.8 |
| 0.3125 | 1 | 0.977 | 1.953 | 2.930 | 3.906 | 4.883 | 5.859 | 6.836 | 7.813 | 10.742 | 15.625 | 3.2 |
| 0.3125 | 1.25 | 0.781 | 1.563 | 2.344 | 3.125 | 3.906 | 4.688 | 5.469 | 6.250 | 8.594 | 12.500 | 4.0 |
| 0.3125 | 1.5 | 0.651 | 1.302 | 1.953 | 2.604 | 3.255 | 3.906 | 4.557 | 5.208 | 7.161 | 10.417 | 4.8 |
| 0.375 | 0.1875 | 7.500 | 15.000 | 22.500 | 30.000 | 37.500 | 45.000 | 52.500 | 60.000 | 82.500 | 120.000 | 0.5 |
| 0.375 | 0.25 | 5.625 | 11.250 | 16.875 | 22.500 | 28.125 | 33.750 | 39.375 | 45.000 | 61.875 | 90.000 | 0.7 |
| 0.375 | 0.375 | 3.750 | 7.500 | 11.250 | 15.000 | 18.750 | 22.500 | 26.250 | 30.000 | 41.250 | 60.000 | 1.0 |
| 0.375 | 0.5 | 2.813 | 5.625 | 8.438 | 11.250 | 14.063 | 16.875 | 19.688 | 22.500 | 30.938 | 45.000 | 1.3 |
| 0.375 | 0.625 | 2.250 | 4.500 | 6.750 | 9.000 | 11.250 | 13.500 | 15.750 | 18.000 | 24.750 | 36.000 | 1.7 |
| 0.375 | 0.75 | 1.875 | 3.750 | 5.625 | 7.500 | 9.375 | 11.250 | 13.125 | 15.000 | 20.625 | 30.000 | 2.0 |
| 0.375 | 0.875 | 1.607 | 3.214 | 4.821 | 6.429 | 8.036 | 9.643 | 11.250 | 12.857 | 17.679 | 25.714 | 2.3 |
| 0.375 | 1 | 1.406 | 2.813 | 4.219 | 5.625 | 7.031 | 8.438 | 9.844 | 11.250 | 15.469 | 22.500 | 2.7 |
| 0.375 | 1.25 | 1.125 | 2.250 | 3.375 | 4.500 | 5.625 | 6.750 | 7.875 | 9.000 | 12.375 | 18.000 | 3.3 |
| 0.375 | 1.5 | 0.938 | 1.875 | 2.813 | 3.750 | 4.688 | 5.625 | 6.563 | 7.500 | 10.313 | 15.000 | 4.0 |
| 0.5 | 0.1875 | 13.333 | 26.667 | 40.000 | 53.333 | 66.667 | 80.000 | 93.333 | 106.667 | 146.667 | 213.333 | 0.4 |
| 0.5 | 0.25 | 10.000 | 20.000 | 30.000 | 40.000 | 50.000 | 60.000 | 70.000 | 80.000 | 110.000 | 160.000 | 0.5 |
| 0.5 | 0.375 | 6.667 | 13.333 | 20.000 | 26.667 | 33.333 | 40.000 | 46.667 | 53.333 | 73.333 | 106.667 | 0.8 |
| 0.5 | 0.5 | 5.000 | 10.000 | 15.000 | 20.000 | 25.000 | 30.000 | 35.000 | 40.000 | 55.000 | 80.000 | 1.0 |
| 0.5 | 0.625 | 4.000 | 8.000 | 12.000 | 16.000 | 20.000 | 24.000 | 28.000 | 32.000 | 44.000 | 64.000 | 1.3 |
| 0.5 | 0.75 | 3.333 | 6.667 | 10.000 | 13.333 | 16.667 | 20.000 | 23.333 | 26.667 | 36.667 | 53.333 | 1.5 |
| 0.5 | 0.875 | 2.857 | 5.714 | 8.571 | 11.429 | 14.286 | 17.143 | 20.000 | 22.857 | 31.429 | 45.714 | 1.8 |
| 0.5 | 1 | 2.500 | 5.000 | 7.500 | 10.000 | 12.500 | 15.000 | 17.500 | 20.000 | 27.500 | 40.000 | 2.0 |
| 0.5 | 1.25 | 2.000 | 4.000 | 6.000 | 8.000 | 10.000 | 12.000 | 14.000 | 16.000 | 22.000 | 32.000 | 2.5 |
| 0.5 | 1.5 | 1.667 | 3.333 | 5.000 | 6.667 | 8.333 | 10.000 | 11.667 | 13.333 | 18.333 | 26.667 | 3.0 |

TABLE 2

| | h | L | % 10% | % 20% | % 30% | % 40% | % 50% | % 60% | % 70% | % 80% | % 90% | % 100% |
|---|---|---|---|---|---|---|---|---|---|---|---|---|
| 1 | 0.063 | 0.188 | 1.5 | 2.0 | 2.0 | 2.0 | 2.5 | 2.5 | 2.5 | 2.5 | 3.0 | 3.5 |
| 2 | 0.063 | 0.25 | 1.5 | 2.0 | 2.0 | 2.0 | 2.0 | 2.5 | 2.5 | 2.5 | 2.5 | 3.0 |
| 3 | 0.063 | 0.375 | 1.0 | 1.5 | 2.0 | 2.0 | 2.0 | 2.0 | 2.0 | 2.0 | 2.5 | 2.5 |
| 4 | 0.063 | 0.5 | 1.0 | 1.5 | 1.5 | 2.0 | 2.0 | 2.0 | 2.0 | 2.0 | 2.5 | 2.5 |
| 5 | 0.063 | 0.625 | 1.0 | 1.5 | 1.5 | 2.0 | 2.0 | 2.0 | 2.0 | 2.0 | 2.0 | 2.5 |
| 6 | 0.063 | 0.75 | 1.0 | 1.0 | 1.5 | 1.5 | 2.0 | 2.0 | 2.0 | 2.0 | 2.0 | 2.0 |
| 7 | 0.063 | 0.875 | 1.0 | 1.0 | 1.5 | 1.5 | 1.5 | 2.0 | 2.0 | 2.0 | 2.0 | 2.0 |
| 8 | 0.063 | 1 | 1.0 | 1.0 | 1.0 | 1.5 | 1.5 | 1.5 | 2.0 | 2.0 | 2.0 | 2.0 |
| 9 | 0.063 | 1.25 | 1.0 | 1.0 | 1.0 | 1.5 | 1.5 | 1.5 | 1.5 | 2.0 | 2.0 | 2.0 |
| 10 | 0.063 | 1.5 | 1.0 | 1.0 | 1.0 | 1.0 | 1.5 | 1.5 | 1.5 | 1.5 | 2.0 | 2.0 |
| 11 | 0.125 | 0.188 | 2.0 | 2.5 | 3.0 | 3.5 | 3.5 | 4.0 | 4.0 | 4.0 | 4.5 | 5.0 |
| 12 | 0.125 | 0.25 | 2.0 | 2.5 | 3.0 | 3.0 | 3.5 | 3.5 | 3.5 | 4.0 | 4.5 | 5.0 |
| 13 | 0.125 | 0.375 | 2.0 | 2.0 | 2.5 | 2.5 | 3.0 | 3.0 | 3.0 | 3.5 | 3.5 | 4.0 |
| 14 | 0.125 | 0.5 | 2.0 | 2.0 | 2.5 | 2.5 | 2.5 | 3.0 | 3.0 | 3.0 | 3.5 | 4.0 |
| 15 | 0.125 | 0.625 | 2.0 | 2.0 | 2.0 | 2.5 | 2.5 | 2.5 | 3.0 | 3.0 | 3.0 | 3.5 |
| 16 | 0.125 | 0.75 | 1.5 | 2.0 | 2.0 | 2.0 | 2.5 | 2.5 | 2.5 | 2.5 | 3.0 | 3.5 |
| 17 | 0.125 | 0.875 | 1.5 | 2.0 | 2.0 | 2.0 | 2.5 | 2.5 | 2.5 | 2.5 | 3.0 | 3.0 |
| 18 | 0.125 | 1 | 1.5 | 2.0 | 2.0 | 2.0 | 2.0 | 2.5 | 2.5 | 2.5 | 2.5 | 3.0 |
| 19 | 0.125 | 1.25 | 1.5 | 2.0 | 2.0 | 2.0 | 2.0 | 2.0 | 2.5 | 2.5 | 2.5 | 3.0 |
| 20 | 0.125 | 1.5 | 1.0 | 1.5 | 2.0 | 2.0 | 2.0 | 2.0 | 2.0 | 2.0 | 2.5 | 2.5 |
| 21 | 0.188 | 0.188 | 3.0 | 3.5 | 4.0 | 4.5 | 5.0 | 5.0 | | | | |
| 22 | 0.188 | 0.25 | 2.5 | 3.0 | 3.5 | 4.0 | 4.5 | 4.5 | 5.0 | 5.0 | | |
| 23 | 0.188 | 0.375 | 2.5 | 3.0 | 3.0 | 3.5 | 3.5 | 4.0 | 4.0 | 4.5 | 5.0 | 5.0 |
| 24 | 0.188 | 0.5 | 2.0 | 2.5 | 3.0 | 3.0 | 3.5 | 3.5 | 4.0 | 4.0 | 4.5 | 5.0 |
| 25 | 0.188 | 0.625 | 2.0 | 2.5 | 2.5 | 3.0 | 3.0 | 3.5 | 3.5 | 3.5 | 4.0 | 4.5 |
| 26 | 0.188 | 0.75 | 2.0 | 2.5 | 2.5 | 3.0 | 3.0 | 3.0 | 3.5 | 3.5 | 4.0 | 4.5 |
| 27 | 0.188 | 0.875 | 2.0 | 2.0 | 2.5 | 2.5 | 3.0 | 3.0 | 3.0 | 3.5 | 3.5 | 4.0 |
| 28 | 0.188 | 1 | 2.0 | 2.0 | 2.5 | 2.5 | 2.5 | 3.0 | 3.0 | 3.0 | 3.5 | 4.0 |
| 29 | 0.188 | 1.25 | 2.0 | 2.0 | 2.0 | 2.5 | 2.5 | 2.5 | 3.0 | 3.0 | 3.0 | 3.5 |
| 30 | 0.188 | 1.5 | 1.5 | 2.0 | 2.0 | 2.5 | 2.5 | 2.5 | 2.5 | 3.0 | 3.0 | 3.5 |
| 31 | 0.25 | 0.188 | 3.5 | 4.0 | 5.0 | 5.0 | | | | | | |
| 32 | 0.25 | 0.25 | 3.0 | 4.0 | 4.5 | 5.0 | 5.0 | | | | | |

TABLE 2-continued

| | h | L | % 10% | % 20% | % 30% | % 40% | % 50% | % 60% | % 70% | % 80% | % 90% | % 100% |
|---|---|---|---|---|---|---|---|---|---|---|---|---|
| 33 | 0.25 | 0.375 | 2.5 | 3.5 | 4.0 | 4.0 | 4.5 | 5.0 | 5.0 | | | |
| 34 | 0.25 | 0.5 | 2.5 | 3.0 | 3.5 | 4.0 | 4.0 | 4.5 | 4.5 | 5.0 | 5.0 | |
| 35 | 0.25 | 0.625 | 2.5 | 3.0 | 3.0 | 3.5 | 4.0 | 4.0 | 4.5 | 4.5 | 5.0 | 5.0 |
| 36 | 0.25 | 0.75 | 2.0 | 2.5 | 3.0 | 3.5 | 3.5 | 4.0 | 4.0 | 4.0 | 4.5 | 5.0 |
| 37 | 0.25 | 0.875 | 2.0 | 2.5 | 3.0 | 3.0 | 3.5 | 3.5 | 4.0 | 4.0 | 4.5 | 5.0 |
| 38 | 0.25 | 1 | 2.0 | 2.5 | 3.0 | 3.0 | 3.5 | 3.5 | 3.5 | 4.0 | 4.5 | 5.0 |
| 39 | 0.25 | 1.25 | 2.0 | 2.5 | 2.5 | 3.0 | 3.0 | 3.0 | 3.5 | 3.5 | 4.0 | 4.5 |
| 40 | 0.25 | 1.5 | 2.0 | 2.0 | 2.5 | 2.5 | 3.0 | 3.0 | 3.0 | 3.5 | 3.5 | 4.0 |
| 41 | 0.313 | 0.188 | 4.0 | 5.0 | | | | | | | | |
| 42 | 0.313 | 0.25 | 3.5 | 4.5 | 5.0 | 5.0 | | | | | | |
| 43 | 0.313 | 0.375 | 3.0 | 4.0 | 4.5 | 5.0 | 5.0 | | | | | |
| 44 | 0.313 | 0.5 | 3.0 | 3.5 | 4.0 | 4.5 | 5.0 | 5.0 | | | | |
| 45 | 0.313 | 0.625 | 2.5 | 3.5 | 3.5 | 4.0 | 4.5 | 5.0 | 5.0 | | | |
| 46 | 0.313 | 0.75 | 2.5 | 3.0 | 3.5 | 4.0 | 4.0 | 4.5 | 4.5 | 5.0 | 5.0 | |
| 47 | 0.313 | 0.875 | 2.5 | 3.0 | 3.5 | 3.5 | 4.0 | 4.0 | 4.5 | 4.5 | 5.0 | 5.0 |
| 48 | 0.313 | 1 | 2.5 | 3.0 | 3.0 | 3.5 | 4.0 | 4.0 | 4.5 | 4.5 | 5.0 | 5.0 |
| 49 | 0.313 | 1.25 | 2.0 | 2.5 | 3.0 | 3.5 | 3.5 | 3.5 | 4.0 | 4.0 | 4.5 | 5.0 |
| 50 | 0.313 | 1.5 | 2.0 | 2.5 | 3.0 | 3.0 | 3.5 | 3.5 | 3.5 | 4.0 | 4.5 | 5.0 |
| 51 | 0.375 | 0.188 | 4.5 | 5.0 | | | | | | | | |
| 52 | 0.375 | 0.25 | 4.0 | 5.0 | 5.0 | | | | | | | |
| 53 | 0.375 | 0.375 | 3.5 | 4.5 | 5.0 | 5.0 | | | | | | |
| 54 | 0.375 | 0.5 | 3.0 | 4.0 | 4.5 | 5.0 | 5.0 | | | | | |
| 55 | 0.375 | 0.625 | 3.0 | 3.5 | 4.0 | 4.5 | 5.0 | 5.0 | | | | |
| 56 | 0.375 | 0.75 | 3.0 | 3.5 | 4.0 | 4.5 | 5.0 | 5.0 | | | | |
| 57 | 0.375 | 0.875 | 2.5 | 3.5 | 4.0 | 4.0 | 4.5 | 5.0 | 5.0 | | | |
| 58 | 0.375 | 1 | 2.5 | 3.0 | 3.5 | 4.0 | 4.5 | 4.5 | 5.0 | 5.0 | | |
| 59 | 0.375 | 1.25 | 2.5 | 3.0 | 3.5 | 3.5 | 4.0 | 4.0 | 4.5 | 4.5 | 5.0 | 5.0 |
| 60 | 0.375 | 1.5 | 2.5 | 3.0 | 3.0 | 3.5 | 3.5 | 4.0 | 4.0 | 4.5 | 5.0 | 5.0 |
| 61 | 0.500 | 0.188 | 5.0 | | | | | | | | | |
| 62 | 0.500 | 0.25 | 5.0 | | | | | | | | | |
| 63 | 0.500 | 0.375 | 4.0 | 5.0 | | | | | | | | |
| 64 | 0.500 | 0.5 | 4.0 | 5.0 | | | | | | | | |
| 65 | 0.500 | 0.625 | 3.5 | 4.5 | 5.0 | | | | | | | |
| 66 | 0.500 | 0.75 | 3.5 | 4.0 | 5.0 | 5.0 | | | | | | |
| 67 | 0.500 | 0.875 | 3.0 | 4.0 | 4.5 | 5.0 | 5.0 | | | | | |
| 68 | 0.500 | 1 | 3.0 | 4.0 | 4.5 | 5.0 | 5.0 | | | | | |
| 69 | 0.500 | 1.25 | 3.0 | 3.5 | 4.0 | 4.5 | 5.0 | 5.0 | | | | |
| 70 | 0.500 | 1.5 | 2.5 | 3.5 | 4.0 | 4.0 | 4.5 | 5.0 | 5.0 | | | |

The testing protocol provides for the preparation of coupons as described previously with 2 category 2 curves, 2 category 3 and 2 category 4 to simulate the changes in both amplitude and wavelength that categorize a typical fiber distortion wave as a 2, 3, or 4. The shape factor and the amplitude are controlled by the inserts that created by selecting a curve from the inspection standard that is a score of 2, 3, or 4. One that has a high (tall) amplitude and one that has a low (short) amplitude. These 6 inserts provide the standard shapes for the resin pocket around which the fiber distortion is created. The location of the insert will either be at the edge, 2 plies in, or at the middle of the coupon, 20 plies in.

The resulting test design is shown in Table 3

TABLE 3

| StdOrder | RunOrder | Amplitude | Wave Shape | location |
|---|---|---|---|---|
| 17 | 1 | short | 3 | edge |
| 14 | 2 | short | 1 | middle |
| 3 | 3 | short | 2 | edge |
| 18 | 4 | short | 3 | middle |
| 12 | 5 | tall | 3 | middle |
| 22 | 6 | tall | 2 | middle |
| 34 | 7 | tall | 2 | middle |
| 13 | 8 | short | 1 | edge |
| 9 | 9 | tall | 2 | edge |
| 35 | 10 | tall | 3 | edge |
| 6 | 11 | short | 3 | middle |
| 19 | 12 | tall | 1 | edge |
| 26 | 13 | short | 1 | middle |
| 29 | 14 | short | 3 | edge |
| 27 | 15 | short | 2 | edge |
| 16 | 16 | short | 2 | middle |
| 24 | 17 | tall | 3 | middle |
| 15 | 18 | short | 2 | edge |
| 30 | 19 | short | 3 | middle |
| 36 | 20 | tall | 3 | middle |
| 7 | 21 | tall | 1 | edge |
| 25 | 22 | short | 1 | edge |
| 5 | 23 | short | 3 | edge |
| 1 | 24 | short | 1 | edge |
| 2 | 25 | short | 1 | middle |
| 33 | 26 | tall | 2 | edge |
| 23 | 27 | tall | 3 | edge |
| 4 | 28 | short | 2 | middle |
| 32 | 29 | tall | 1 | middle |
| 20 | 30 | tall | 1 | middle |
| 31 | 31 | tall | 1 | edge |
| 21 | 32 | tall | 2 | edge |
| 10 | 33 | tall | 2 | middle |
| 11 | 34 | tall | 3 | edge |
| 8 | 35 | tall | 1 | middle |
| 28 | 36 | short | 2 | middle |

The test protocol is repeated as required to determine initial failure using a load line parallel to or normal to the axis of the marcel with a force testing machine at varying head speeds.

Repetition of the protocol for varying temperature and moisture or other operationally specific environmental conditions provides additional data to establish acceptance criteria. The stress levels for fatigue testing will vary by material and category of distortion.

The data provided by the test protocol is then applied to the distortion characteristics defined in Table 2 to provide a definitive means for determining whether the associated defect as characterized by the table has engineering structural properties sufficient for a "use as is" determination or whether the structural properties warrant a "scrap" disposition.

The curves of FIG. 2 provide templates for determination of approximate shape of a distortion in a production composite identifiable using the tracer fibers present in the layup. Tracer fibers are doped prior to composite creation to allow visualization of fiber placement and distortion.

Figure 4A:
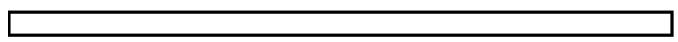
FIGS. 4a-4i show comparative standard templates for determination of distortion sizing.
Figure 4B:
Figure 4C:
Figure 4D:
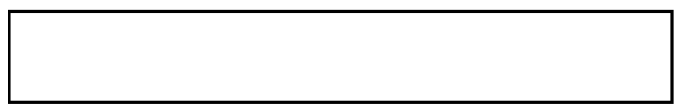
Figure 4E:
Figure 4F:
Figure 4G:
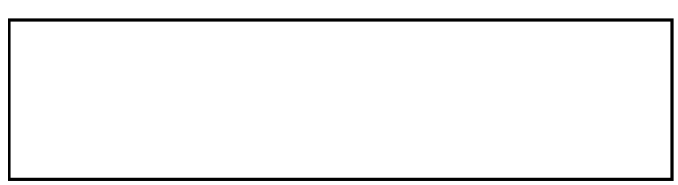
Figure 4H:
Figure 4I:

The templates of FIGS. 4a-4i are employed in inspection to determine the number of plies affected by a distortion for the composite embodiments defined herein. FIG. 4a provides a boundary for a distortion involving 10 plies or less, FIG. 4b a boundary for a distortion involving 20 plies or less FIG. 4c 30 plies or less, FIG. 4d 40 plies or less, FIG. 4e 50 plies or less, FIG. 4f 60 plies or less, FIG. 4g 70 plies or less, FIG. 4h 80 plies or less and FIG. 4i 90 plies or less.

Figure 5:
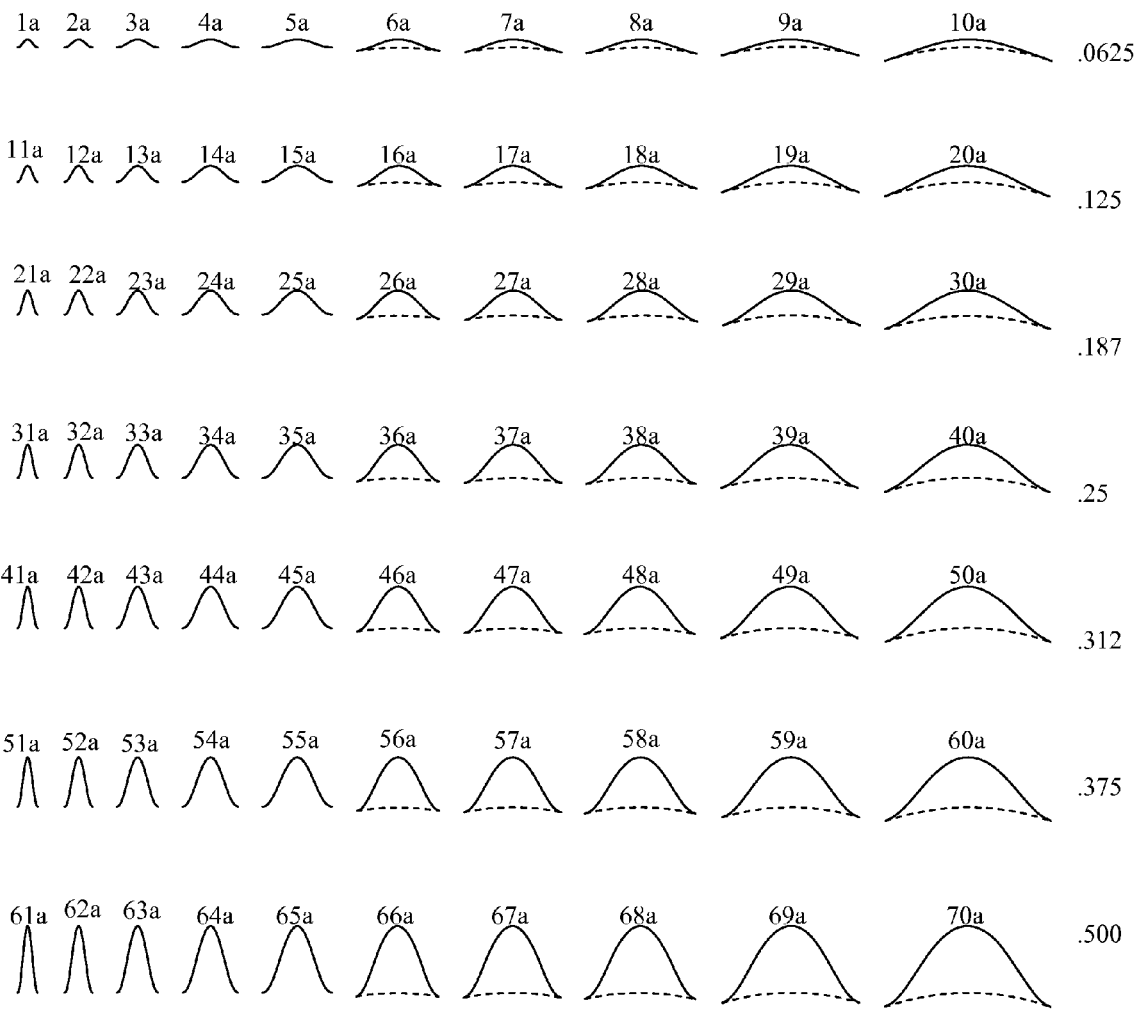
FIG. 5 shows comparative standard templates for pin regions with positive curvature; and, FIG. 6 shows comparative standard templates for pin regions with negative curvature.
Figure 6:
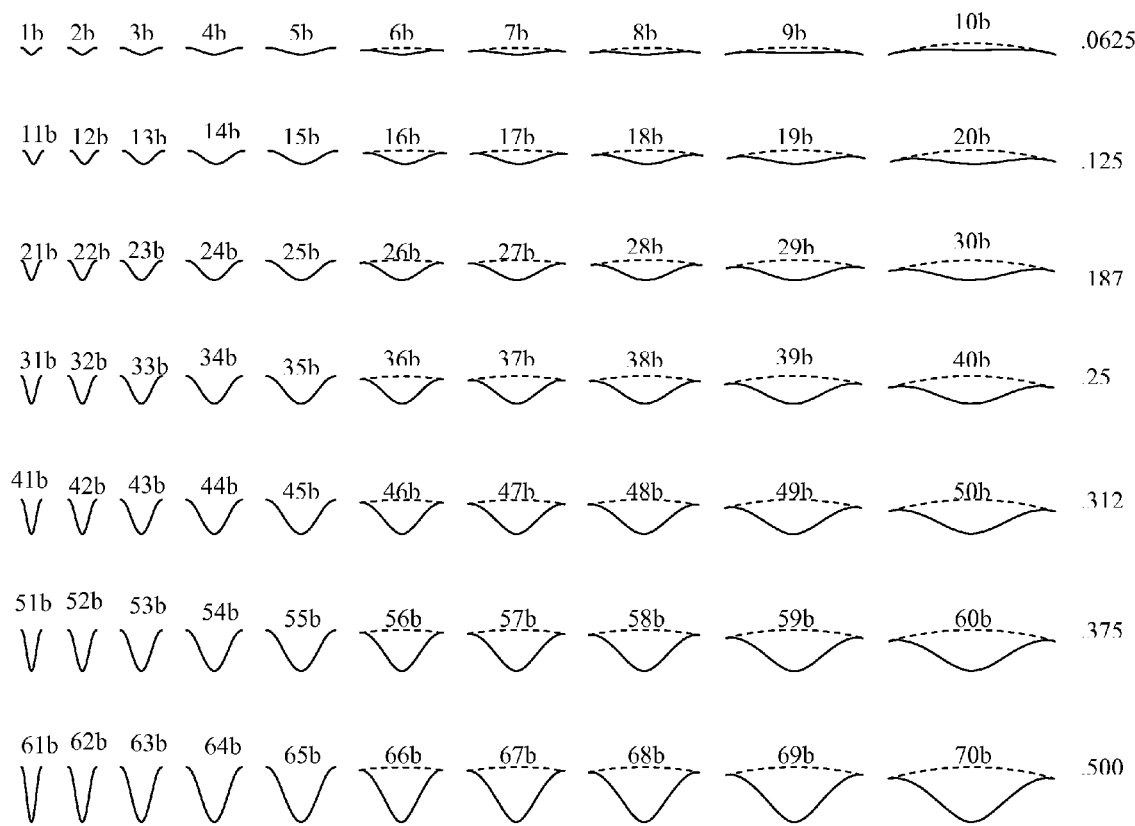

FIGS. 5 and 6 provide templates for determination of approximate shape of a distortion in a production composite identifiable using the tracer fibers where the distortion is present in a region surrounding a pin in the layup. FIG. 5 with shapes 1A-60A provide the positive curvature while FIG. 6 with shapes 1B-60B demonstrate a negative curvature.

The determined shape and number of plies involved in a distortion are then applied to define the distortion category for determining the appropriate disposition of the defect.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A method for testing marceled defects in composite materials comprising the steps of:
    defining a distortion category matrix based on shape of a distortion,
    preparing a plurality of predetermined distortion shapes precured from base resin;
    inserting each of the plurality of distortion shapes in a predetermined position in a composite layup;
    creating a plurality of multiple ply layups, each layup including one of the distortion shapes;
    curing the multiple ply layups;
    slicing each of the layups perpendicular to the layup direction to create coupons for testing;
    fatigue testing each of the plurality of multiple ply layups.

2. A method as defined in claim 1 wherein the step of creating a plurality of multiple ply layups includes placing the distortion shape at a surface ply.

3. A method as defined in claim 1 wherein the step of creating a plurality of multiple ply layups includes placing the distortion shape 2 layers in from the surface ply.

4. A method as defined in claim 1 wherein the step of creating a plurality of multiple ply layups includes placing the distortion shape at the center of the layup.

5. A method as defined in claim 1 wherein the step of preparing a plurality of predetermined distortion shapes includes
    machining a distortion shape in a mold;
    filling the mold with resin; and
    precuring the resin pool distortion shape.

6. A method as defined in claim 1 further comprising the steps of
    creating a fatigue life determination matrix for each resin pool distortion shape and location
    establishing a disposition criterion based on the fatigue life determination matrix.

7. A method for testing marceled defects in composite materials comprising the steps of:
    defining a matrix of distortion shapes;
    determining the aspect ratio, h/L, based on the distortion amplitude and length for each of the shapes;
    determining a figure of merit based on the aspect ratio relative to overall fiber distortion; and,
    establishing a distortion category based on the figure of merit;
    preparing a plurality of predetermined distortion shapes from base resin;
    inserting each of the plurality of distortion shapes in a predetermined position in a composite layup;
    creating a plurality of multiple ply layups, each layup including one of the distortion shapes;
    curing the multiple ply layups;
    slicing each of the layups perpendicular to the layup direction to create coupons for testing;
    fatigue testing each of the plurality of multiple ply layups.

8. A method as defined in claim 7 wherein the predetermined distortion shapes are defined by selection of chosen distortion categories and a set of associated amplitudes.

9. A method as defined in claim 7 wherein the step of determining a figure of merit comprises the step of multiplying the distortion length by the aspect ratio multiplied by a percentage of fiber involvement based on a function equal to said percentage for lugs with less than 80% distortion and growing to 160% for completely involved lugs.

10. A method as defined in claim 9 wherein the step of establishing a distortion category comprises the step of defining the distortion category as 1 if the FOM is less than or equal to 0.125; 1.5 if 0.125<FOM<=0.25; 2 if 0.25<FOM<=0.85; 2.5 if 0.85<FOM<=1.75; 3 if 1.75<FOM<=3.1; 3.5 if 3.1<FOM<=4.8; 4 if 4.8<FOM<=6.8; 4.5 if 6.8<FOM<=9.3; and 5 if the FOM>9.

* * * * *